(12) United States Patent
Horner et al.

(10) Patent No.: US 11,975,766 B2
(45) Date of Patent: *May 7, 2024

(54) BED SIDEGATE

(71) Applicant: Magna Exteriors Inc., Concord (CA)

(72) Inventors: Robert M. Horner, Ferndale, MI (US); Larry R. Erickson, Birmingham, MI (US); Andrew E. Sicherman, Royal Oak, MI (US); Michael S. Spagnuolo, Shelby Township, MI (US); Peter G. DeMarois, Troy, MI (US); Brian Staley, Bloomfield, MI (US)

(73) Assignee: Magna Exteriors Inc., Aurora (CA)

( * ) Notice: Subject to any disclaimer, the term of this patent is extended or adjusted under 35 U.S.C. 154(b) by 42 days.

This patent is subject to a terminal disclaimer.

(21) Appl. No.: 17/513,459

(22) Filed: Oct. 28, 2021

(65) Prior Publication Data

US 2022/0119045 A1    Apr. 21, 2022

Related U.S. Application Data

(63) Continuation-in-part of application No. 17/365,648, filed on Jul. 1, 2021.

(60) Provisional application No. 63/160,438, filed on Mar. 12, 2021, provisional application No. 63/107,904, filed on Oct. 30, 2020, provisional application No. 63/047,510, filed on Jul. 2, 2020.

(51) Int. Cl.
    *B62D 33/027*    (2006.01)

(52) U.S. Cl.
    CPC ....... *B62D 33/0273* (2013.01); *B62D 33/027* (2013.01)

(58) Field of Classification Search
    CPC .. B62D 33/023; B62D 33/027; B62D 33/037; B60J 5/0477; B60J 5/0497; B60J 5/047; B60J 5/0472; B60J 5/0473
    See application file for complete search history.

(56) References Cited

U.S. PATENT DOCUMENTS

| | | | | |
|---|---|---|---|---|
| 4,861,096 A | * | 8/1989 | Hastings | B60J 5/0497 296/183.1 |
| 5,921,613 A | * | 7/1999 | Breunig | B60J 5/06 296/146.12 |
| 6,030,018 A | * | 2/2000 | Clare | B60J 10/24 224/404 |
| 6,059,341 A | * | 5/2000 | Jensen | B60P 3/14 292/29 |
| 6,183,039 B1 | * | 2/2001 | Kohut | E05D 15/1081 296/146.12 |
| 6,533,344 B1 | * | 3/2003 | Patterson | B60J 7/1621 296/100.1 |
| 6,644,708 B1 | * | 11/2003 | Grzegorzewski | B62D 33/0273 296/100.06 |
| 6,793,268 B1 | * | 9/2004 | Faubert | B60J 5/06 296/146.12 |
| 6,808,223 B1 | * | 10/2004 | Baum | E05D 15/00 296/146.12 |

(Continued)

*Primary Examiner* — Gregory A Blankenship
(74) *Attorney, Agent, or Firm* — Warn Partners, P.C.

(57) ABSTRACT

An access door for a vehicle including an open bed assembly including a front wall, two side walls and a rear wall. A door portion on one of the side walls of the liftgate opening on a substantially vertical hinged axis for providing side access to the truck bed.

9 Claims, 20 Drawing Sheets

(56) References Cited

U.S. PATENT DOCUMENTS

| | | | | |
|---|---|---|---|---|
| 6,883,855 B2* | 4/2005 | Chverchko | B60J 7/1621 | 296/100.09 |
| 7,219,941 B1* | 5/2007 | San Paolo | B60R 9/00 | 224/404 |
| 7,431,368 B2* | 10/2008 | Henderson | B62D 33/0273 | 296/37.6 |
| 7,461,884 B2* | 12/2008 | Clare | B60J 10/60 | 296/37.6 |
| 7,591,504 B1* | 9/2009 | Schrader | B60J 5/0476 | 296/146.12 |
| 7,611,190 B1* | 11/2009 | Elliott | B60J 5/06 | 49/248 |
| 7,651,146 B2* | 1/2010 | Anderson | B60R 7/02 | 296/37.6 |
| 7,677,626 B2* | 3/2010 | Hanzel | B62D 33/0273 | 296/26.11 |
| 7,686,365 B2* | 3/2010 | Thelen | B60R 9/00 | 296/181.3 |
| 7,770,960 B2* | 8/2010 | Greenbank | B60J 5/0472 | 296/146.12 |
| 7,779,510 B2* | 8/2010 | Hoffman | E05D 3/10 | 296/146.12 |
| 7,887,118 B2* | 2/2011 | Elliott | B60J 5/06 | 296/146.12 |
| 7,918,492 B2* | 4/2011 | Elliott | E05D 3/125 | 296/146.12 |
| 7,950,728 B2* | 5/2011 | Plavetich | B60R 9/00 | 296/22 |
| 8,038,195 B1* | 10/2011 | Hutcheson | B60R 9/00 | 296/136.04 |
| 9,027,984 B2* | 5/2015 | Bates | B60J 5/0476 | 296/186.4 |
| 9,463,745 B2* | 10/2016 | Reynolds | B60R 3/00 | |
| 9,923,294 B1* | 3/2018 | Maranville | H01R 13/08 | |
| 10,022,016 B1* | 7/2018 | Streett | B60P 3/36 | |
| 11,312,310 B2* | 4/2022 | Symonds | B62D 33/023 | |
| 2005/0146159 A1* | 7/2005 | Shen | E05D 15/34 | 296/155 |
| 2006/0119134 A1* | 6/2006 | Dean | B62D 33/0273 | 296/182.1 |
| 2006/0152029 A1* | 7/2006 | Tomasson | B60J 5/105 | 296/51 |
| 2006/0219746 A1* | 10/2006 | Kniffel | B60R 9/00 | 224/404 |
| 2007/0245525 A1* | 10/2007 | Hoffman | E05F 15/622 | 16/367 |
| 2008/0191506 A1* | 8/2008 | Huotari | A47B 37/00 | 224/404 |
| 2009/0195007 A1* | 8/2009 | Miller | B60P 3/40 | 296/26.11 |
| 2016/0236724 A1* | 8/2016 | Borges Filho | B60P 3/40 | |
| 2016/0237727 A1* | 8/2016 | Balaz | E05F 1/1215 | |
| 2018/0162284 A1* | 6/2018 | Lewis | B60R 7/02 | |
| 2019/0160922 A1* | 5/2019 | Hagedorn | B60J 5/0477 | |
| 2019/0218838 A1* | 7/2019 | Von Koenigsegg | E05D 3/147 | |
| 2020/0114826 A1* | 4/2020 | Stojkovic | H01M 10/6568 | |
| 2020/0164781 A1* | 5/2020 | Pascarella | B60R 9/06 | |
| 2020/0165858 A1* | 5/2020 | Reif | E05F 15/622 | |
| 2020/0180707 A1* | 6/2020 | Johnson | B60P 3/14 | |
| 2020/0290525 A1* | 9/2020 | Viniegra | B60J 11/06 | |
| 2021/0086680 A1* | 3/2021 | Kyle | H05B 6/12 | |
| 2022/0169322 A1* | 6/2022 | Snede | B62D 33/037 | |

* cited by examiner

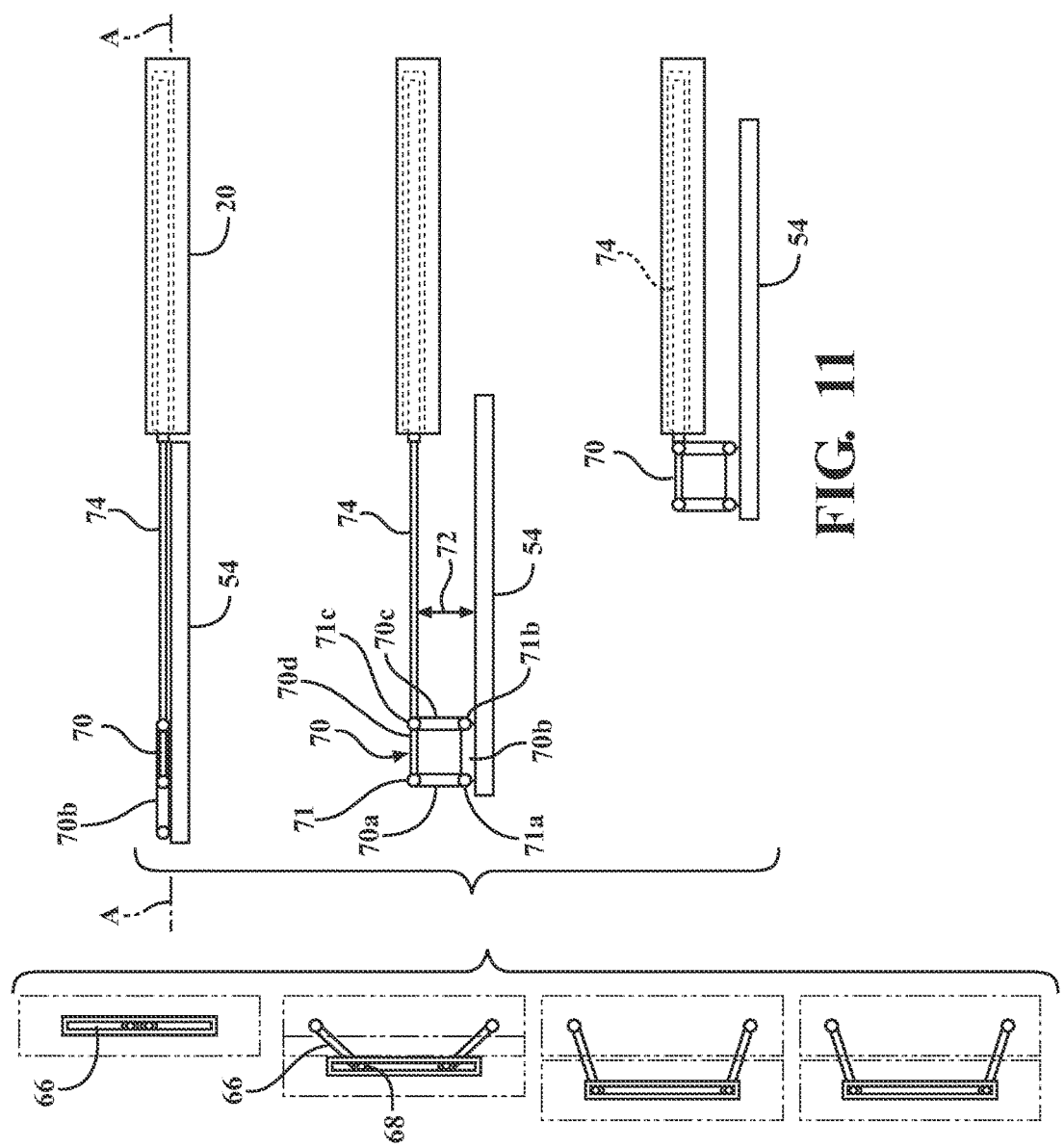
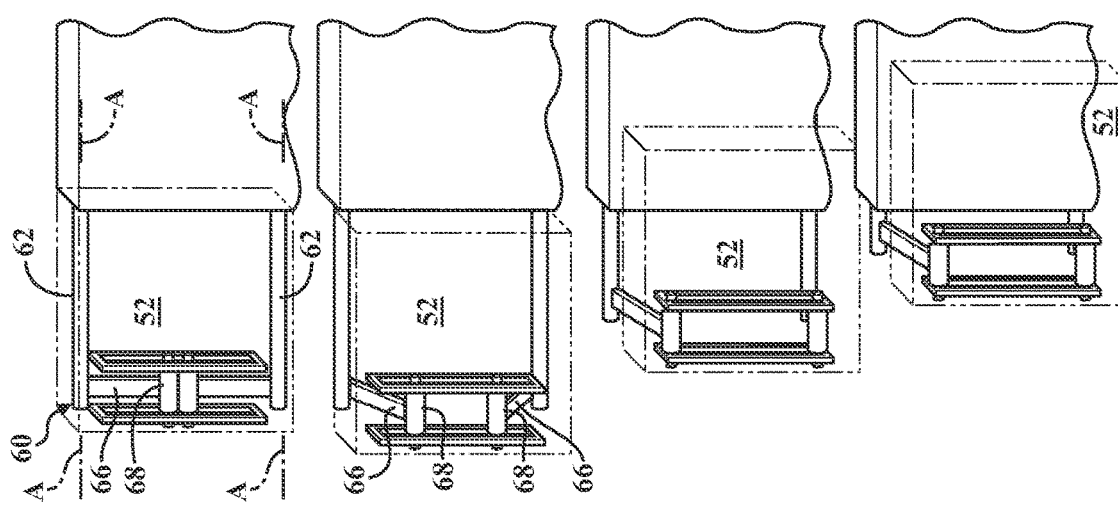
FIG. 10
FIG. 11

BED SIDEGATE

CROSS-REFERENCE TO RELATED APPLICATIONS

This application is a continuation-in-part of U.S. patent application Ser. No. 17/365,648, filed Jul. 1, 2021, which claims the benefit of U.S. Provisional Patent Application Ser. No. 63/047,510, filed Jul. 2, 2020, and which claims the benefit of U.S. Provisional Patent Application Ser. No. 63/107,904, filed Oct. 30, 2020, and which claims the benefit of U.S. Provisional Patent Application Ser. No. 63/160,438, filed Mar. 12, 2021. The disclosures of the above applications are incorporated herein by reference.

FIELD OF THE INVENTION

The present invention relates to side access for a pickup truck bed.

BACKGROUND OF THE INVENTION

Pickup truck vehicles having a rear storage bed enclosure have become increasingly popular to consumers. These vehicles allow storage and transport to any number of items in the back pickup bed area. Unfortunately, cargo and items may slide to the front area of the pickup bed next to the vehicle cab. This is an awkward area to reach. There is typically a wall to reach over behind the cab and the rear gate access is 5 to 8 feet from the front cab area of the bed which is too far to reach with a user's normal reach. Therefore, reaching items or placing items in the front of a pickup bed interior is a challenging endeavor with often involves actually climbing in the back of the pickup bed to move items toward the rear gate for access.

Therefore, it had been a goal in the art to provide access to the front of a pickup bed interior without climbing into the bed or necessity of a step or other climbing features.

A door is incorporated into the bed side that allows the user to reach the areas of the pickup bed interior formally beyond their reach.

A door located on the side of the pickup bed that opens outward is made up of a portion of the bed exterior surface and the corresponding portion of the interior surface. The door will be hinged in a manner to allow the user the best ability to reach into the bed while standing on the ground. Hinging and latching the door will provide security when other areas of the bed are closed off.

It is a goal in the art to provide increased access to the front areas of the bed interior without having to climb into the bed.

SUMMARY OF THE INVENTION

A door located on the side of the pickup bed that opens outward is made up of a portion of the bed exterior surface and the corresponding portion of the interior surface. The door will be hinged in a manner to allow the user the best ability to reach into the bed while standing on the ground. Hinging and latching the door will provide security when other areas of the bed are closed off.

An access door for a vehicle including an open bed assembly including a front wall, two side walls and a rear wall. A door portion on one of the side walls of the liftgate opening on a hinged axis for providing side access to the truck bed.

A door is incorporated into the bed side that allows the user to reach the areas of the pickup bed interior formally beyond their reach.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a perspective view showing a rotational rod hinging mechanism for opening of the door of FIGS. 9a-9d;

FIG. 11 is a top view showing a four-bar link hinge opening mechanism;

DETAILED DESCRIPTION OF THE PREFERRED EMBODIMENTS

Figure 1:
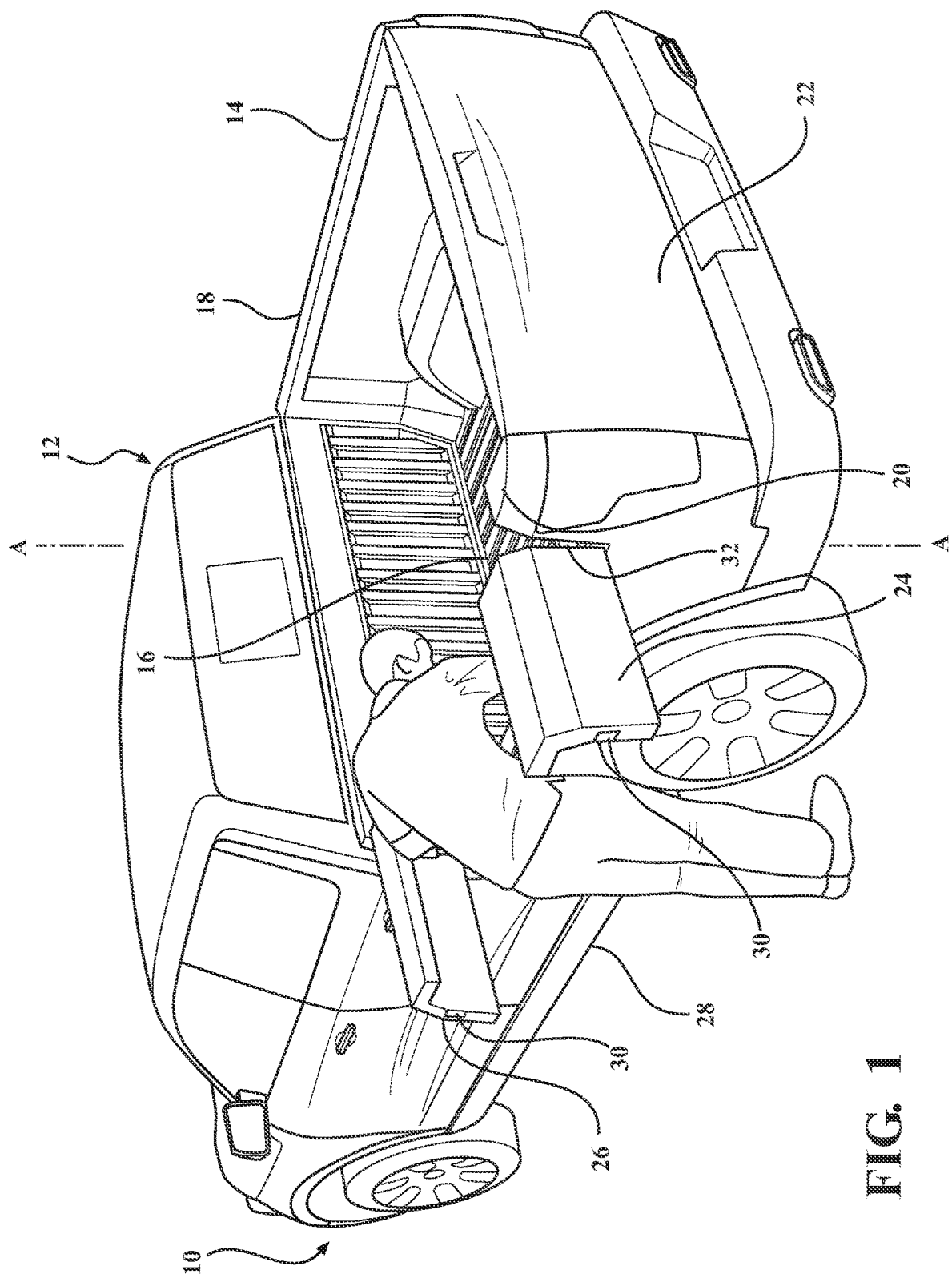
FIG. 1 is a perspective view of an access door for a truck bed in accordance with the teachings of the present invention.

The following description of the preferred embodiment(s) is merely exemplary in nature and is in no way intended to limit the invention, its application, or uses.

A door located on the side of the pickup bed that opens outward is made up of a portion of the bed exterior surface and the corresponding portion of the interior surface. The door will be hinged in a manner to allow the user the best ability to reach into the bed while standing on the ground. Hinging and latching the door will provide security when other areas of the bed are closed off.

An access door generally shown at 10 for a vehicle 12 is provided by the present invention. An open bed assembly 14 includes a front wall 16, two side walls 18, 20 and a rear wall 22.

The vehicle 12 is a typical pickup truck vehicle as are known and popular in motor vehicles today. Other vehicles with a vertical side may likewise utilize the present invention. At least one door portion 24 on one of the side walls 20 or 18 of the liftgate opening is provided to provide access to the interior area of the truck bed 14. The door 24 is hinged for opening on a substantially vertical hinged axis A-A for providing side access to the truck bed 14. Preferably two doors 24, 26 are provided. Doors 24 and 26 open on a vertical hinged access and meet in a middle area 28 of the side truck bed wall 20. The hinges for the doors are near the front end 16 and rear end 22 of the bed 14. A latching mechanism is provided for holding the doors closed or allowing them to swing outward for access to the interior of truck bed 14. In an alternate, embodiment doors are provided on both sides of the truck gate.

The doors 24 and 26 located on the side of the pickup bed are made up of a portion of the bed exterior surface and the corresponding portion of the interior surface. The door will be hinged in a manner to allow the user the best ability to reach into the bed while standing on the ground. Hinging and latching the door will provide security when other areas of the bed are closed off.

Figure 2:
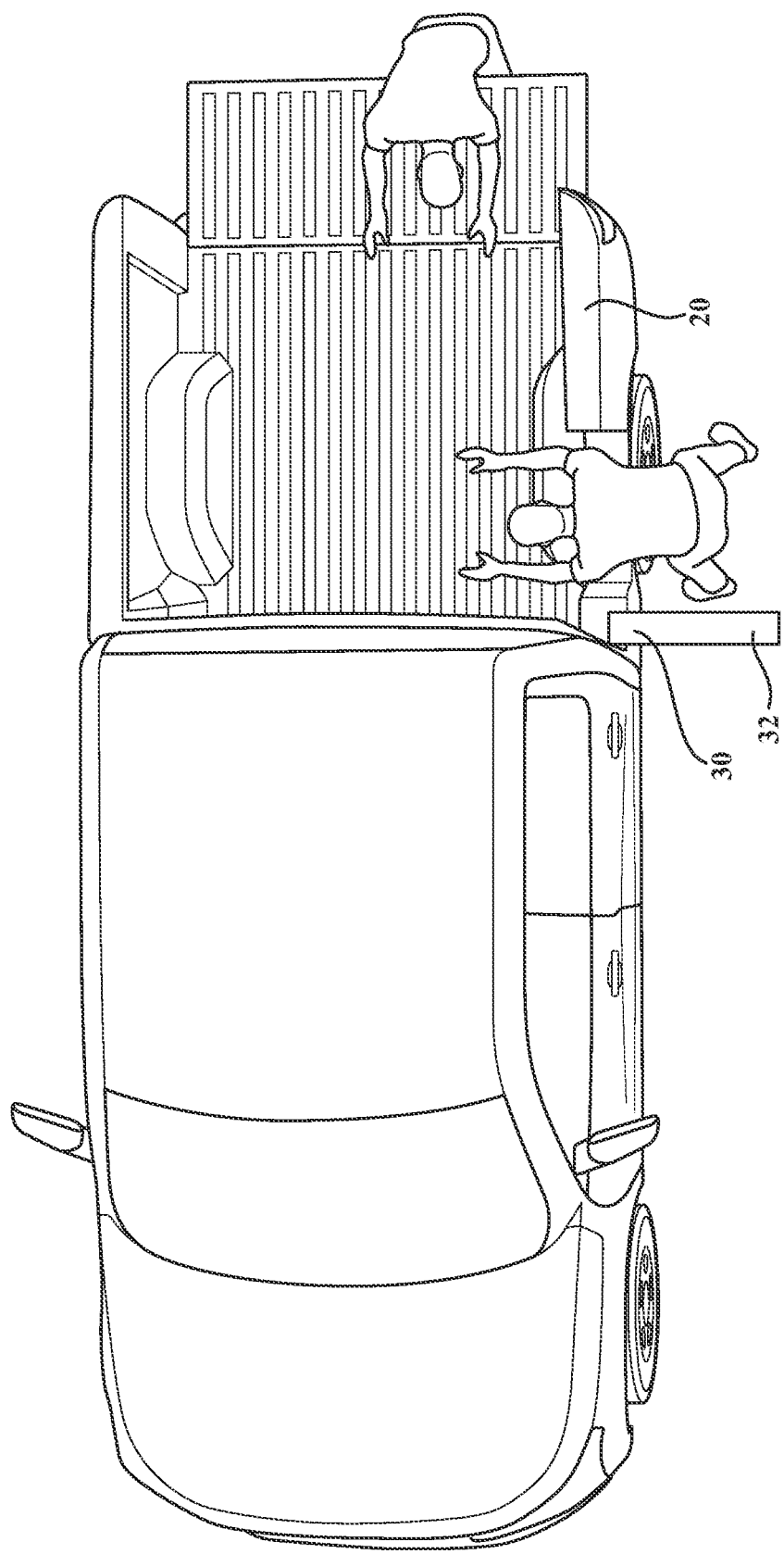
FIG. 2 is a top view showing accessing the pickup bed of a pickup truck.

Referring now to FIG. 2 shows a front hinge 30 on a outward opening door 32 side access through the side bed wall 20. As demonstrated access at the front of the bed is facilitated through the opening. The person at the rear could not otherwise reach the front area of the bed by way of the tail gate without jumping into the pickup truck box.

Figure 3:
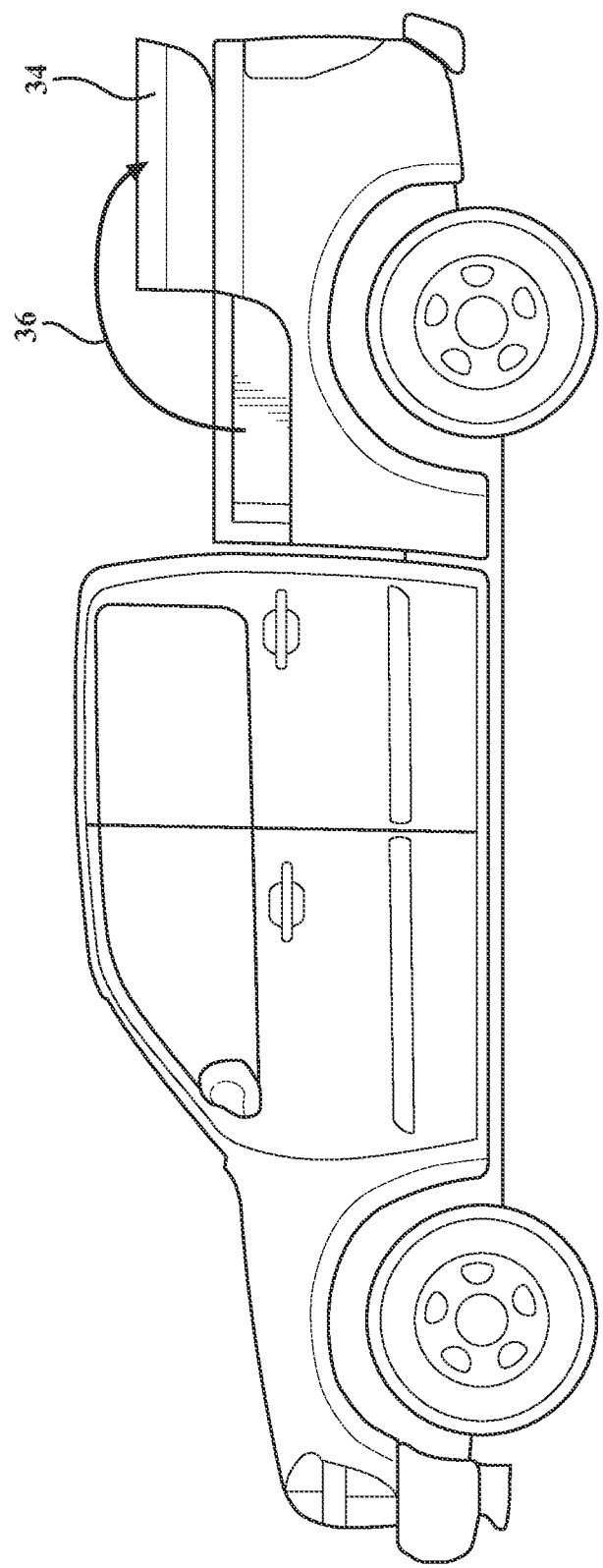
FIG. 3 is a side view of a pickup bed door showing a front side door hinged for opening in a longitudinal direction.
Figure 4:
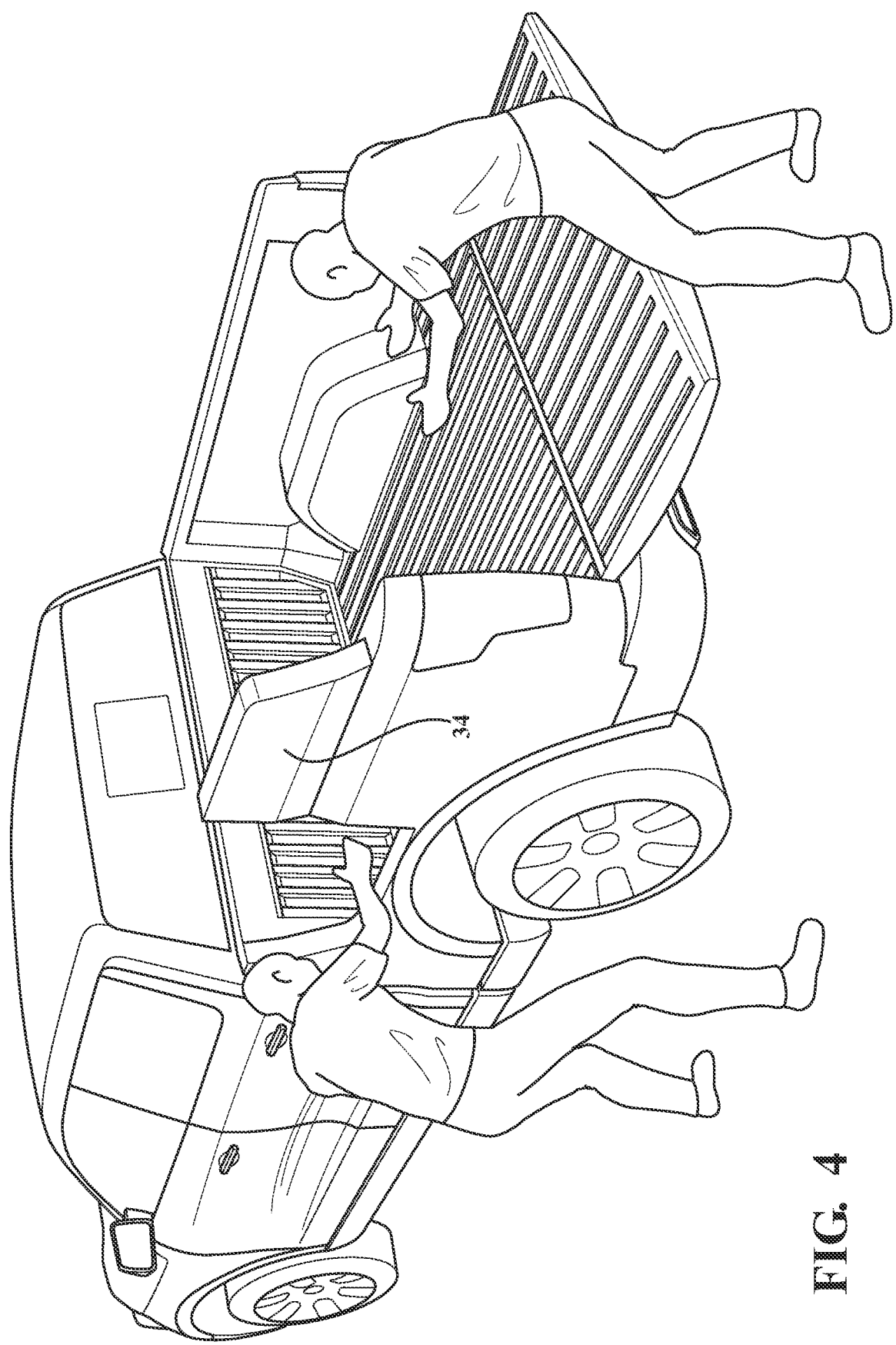
FIG. 4 is a perspective view of the door of FIG. 3.

FIGS. 3 and 4 show an alternate door embodiment wherein the side door 34 is hinged in order to move the door 34 upward and over in a longitudinal direction as shown by arrow 36 the door rests on the top of the bed side wall 20 in this embodiment.

Figure 5:
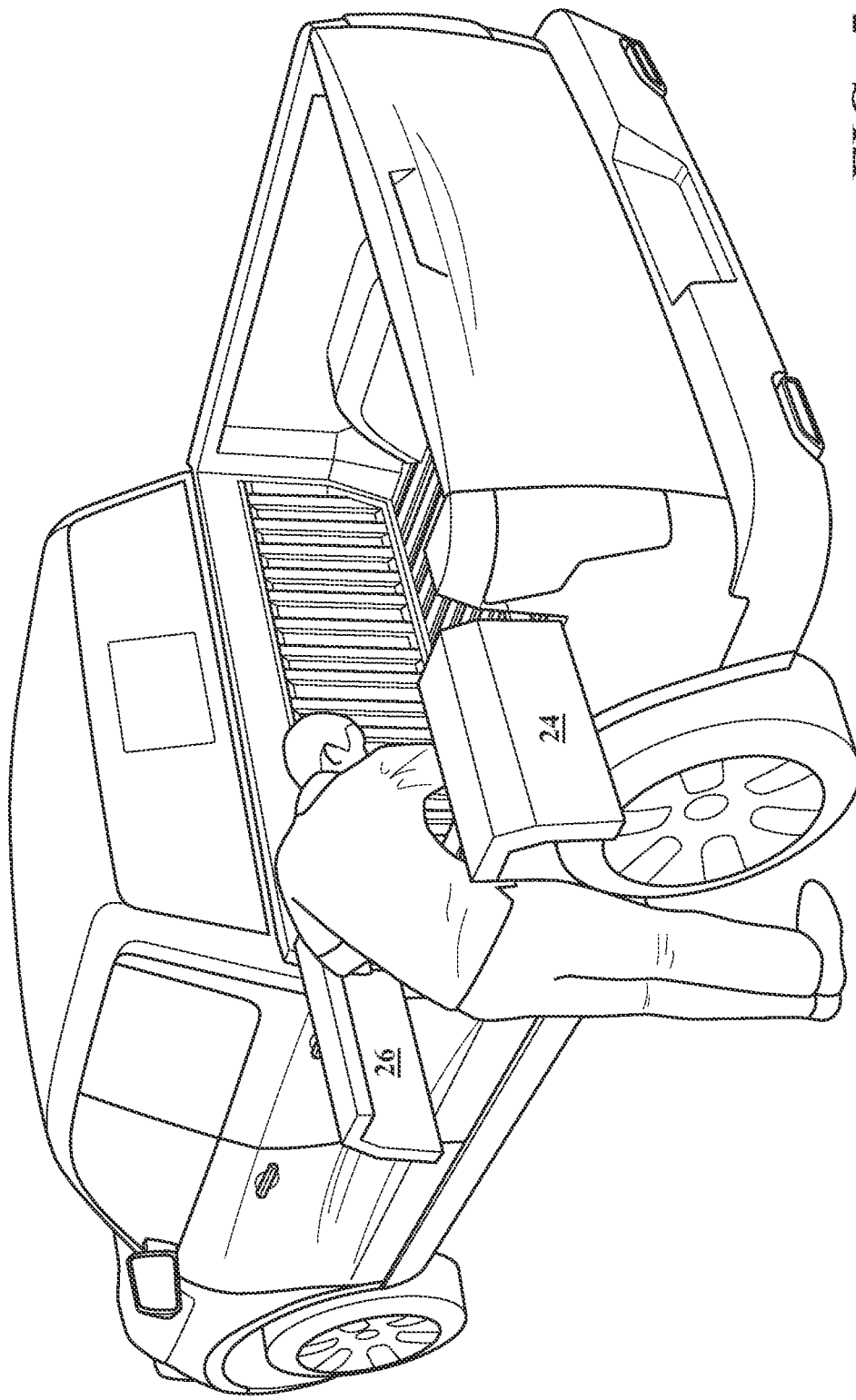
FIG. 5 is a perspective view of an alternate embodiment of the door arrangement shown in FIG. 1.
Figure 6:
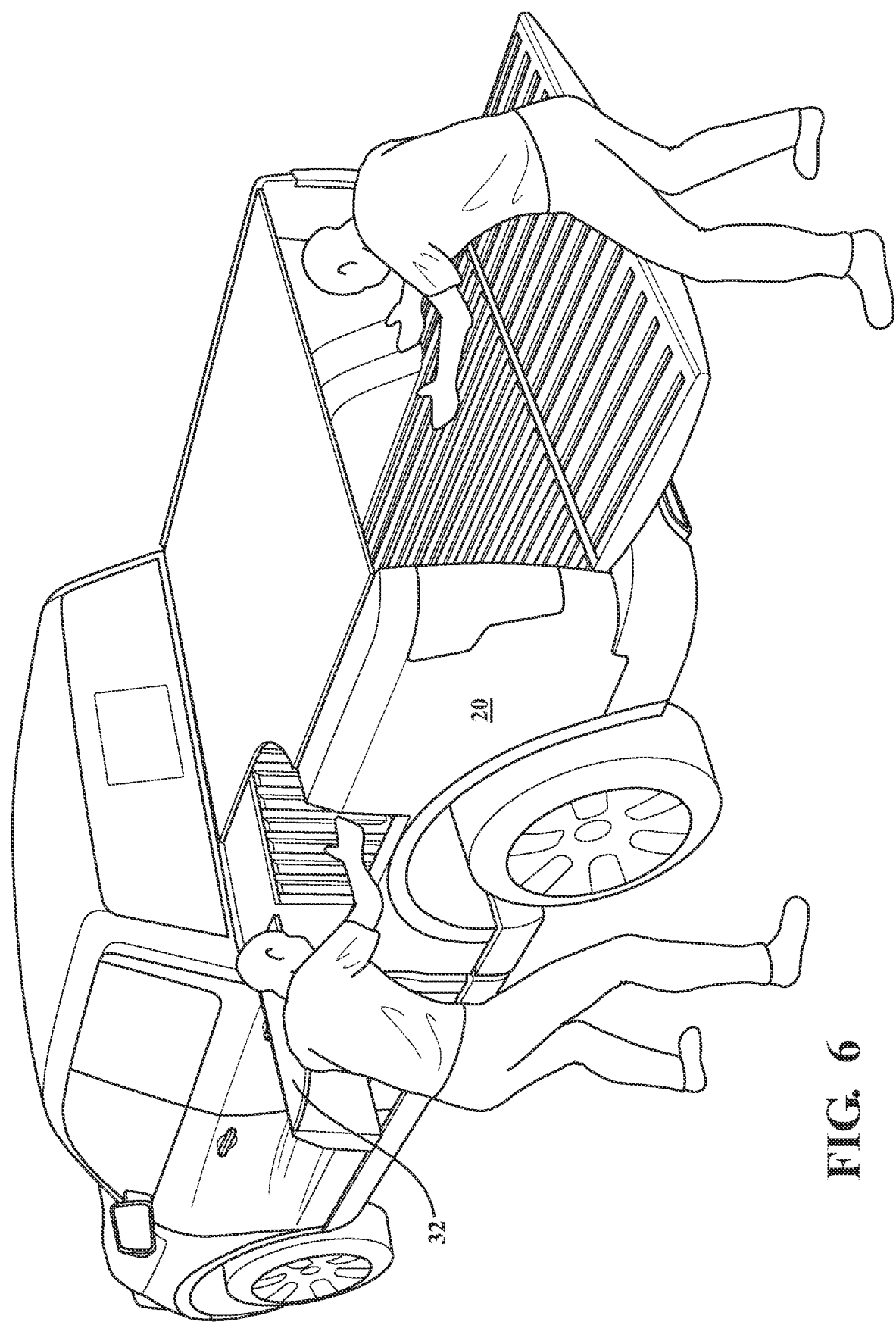
FIG. 6 is a side perspective view of a vertically hinged single side door version of the access door of the present invention such as shown in FIG. 2.
Figure 7A:
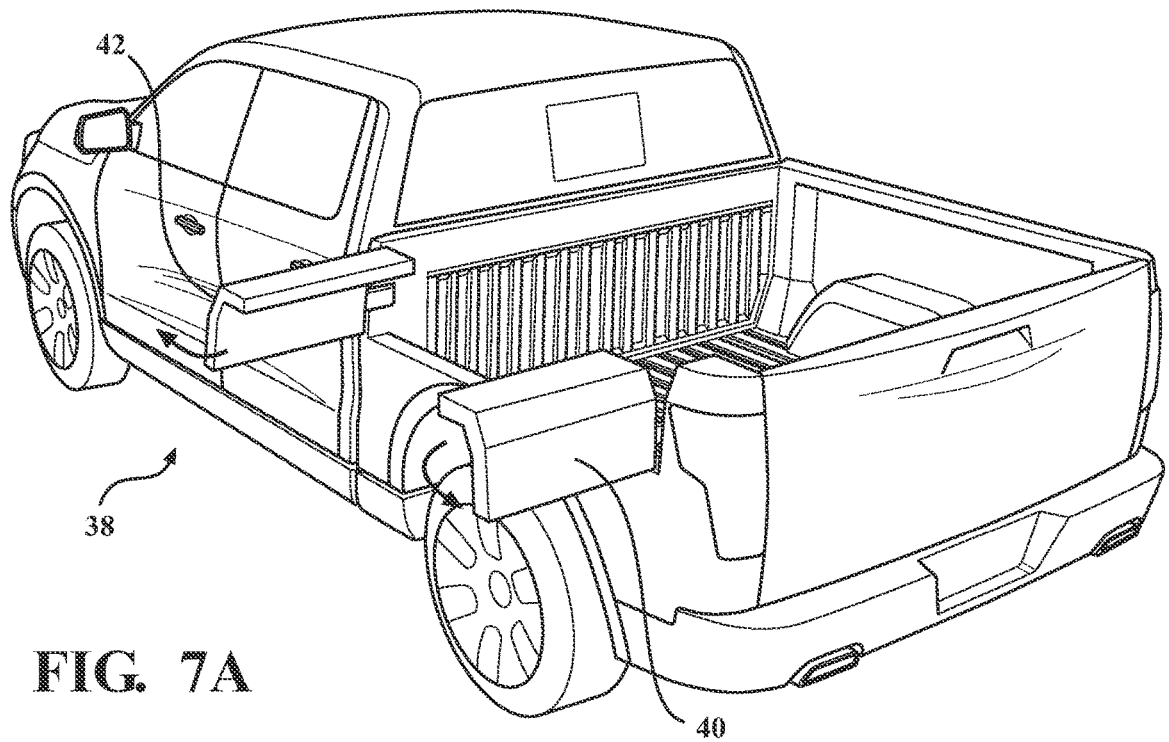
FIG. 7a-7f are perspective views of an alternate embodiment of the door of the present invention showing a multi-position door in accordance with the present invention.
Figure 7B:
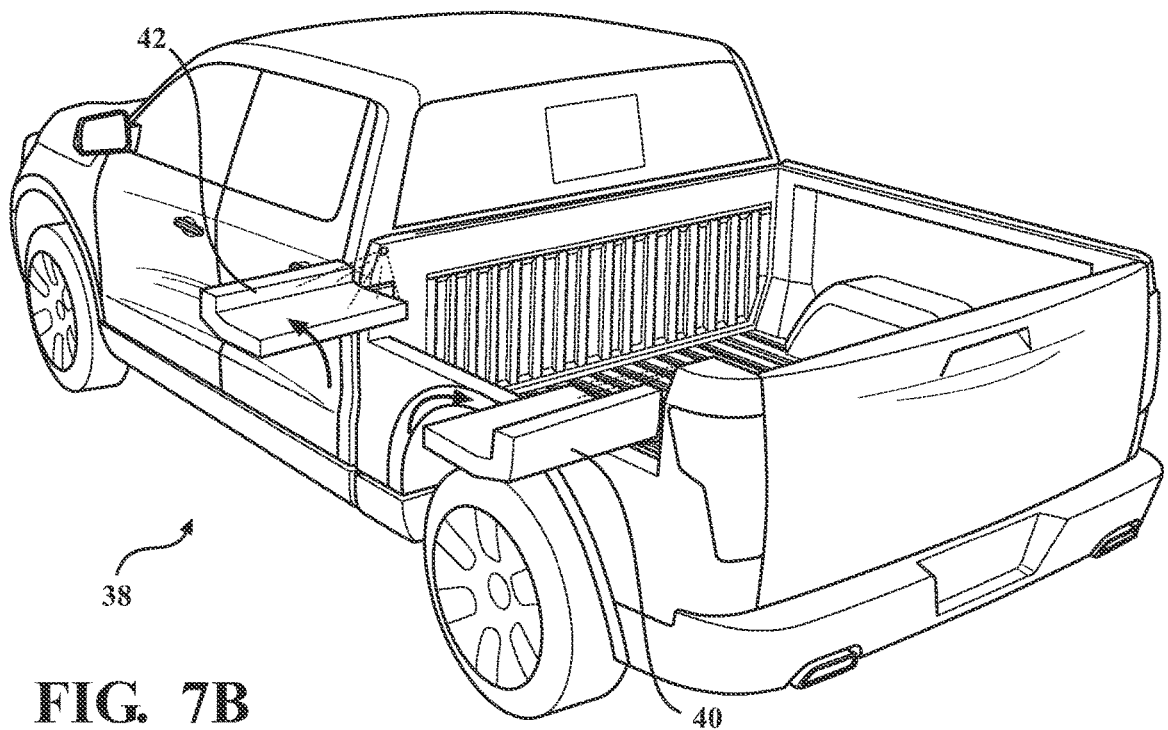
Figure 7C:
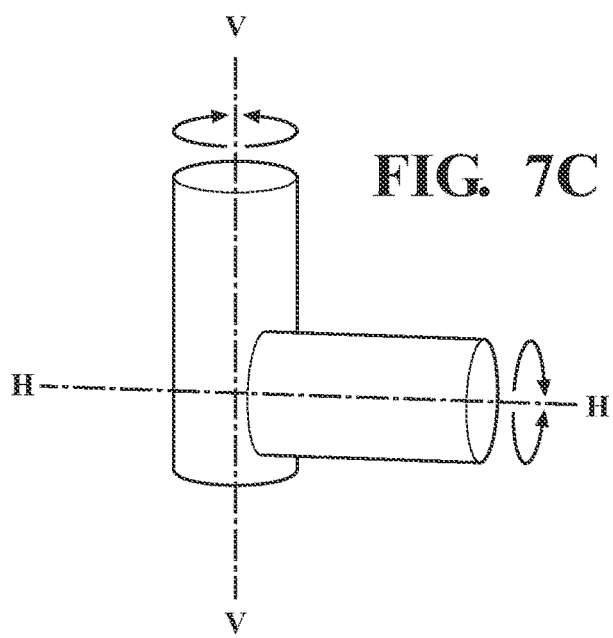
Figure 7D:
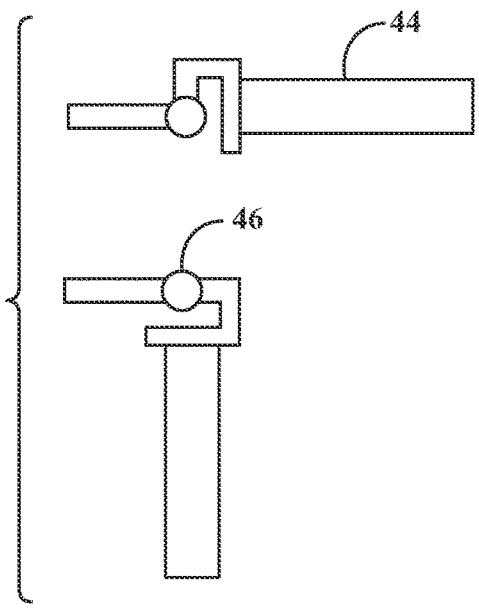
Figure 7E:
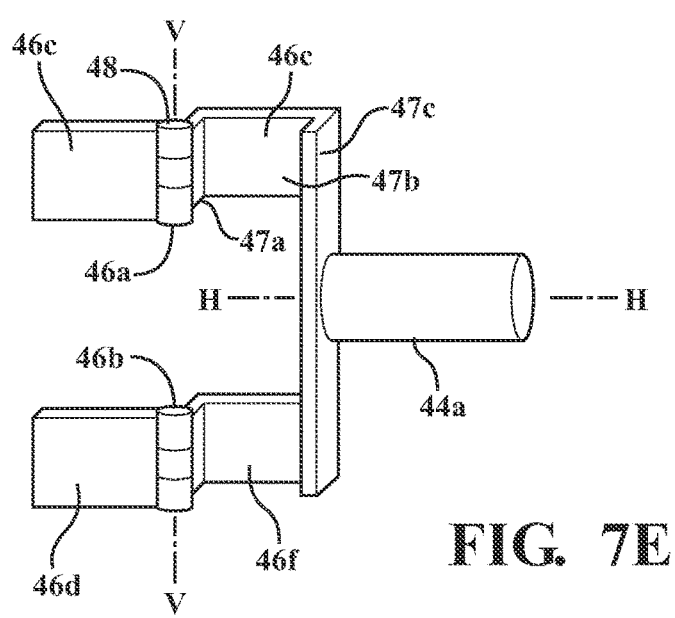
Figure 7F:
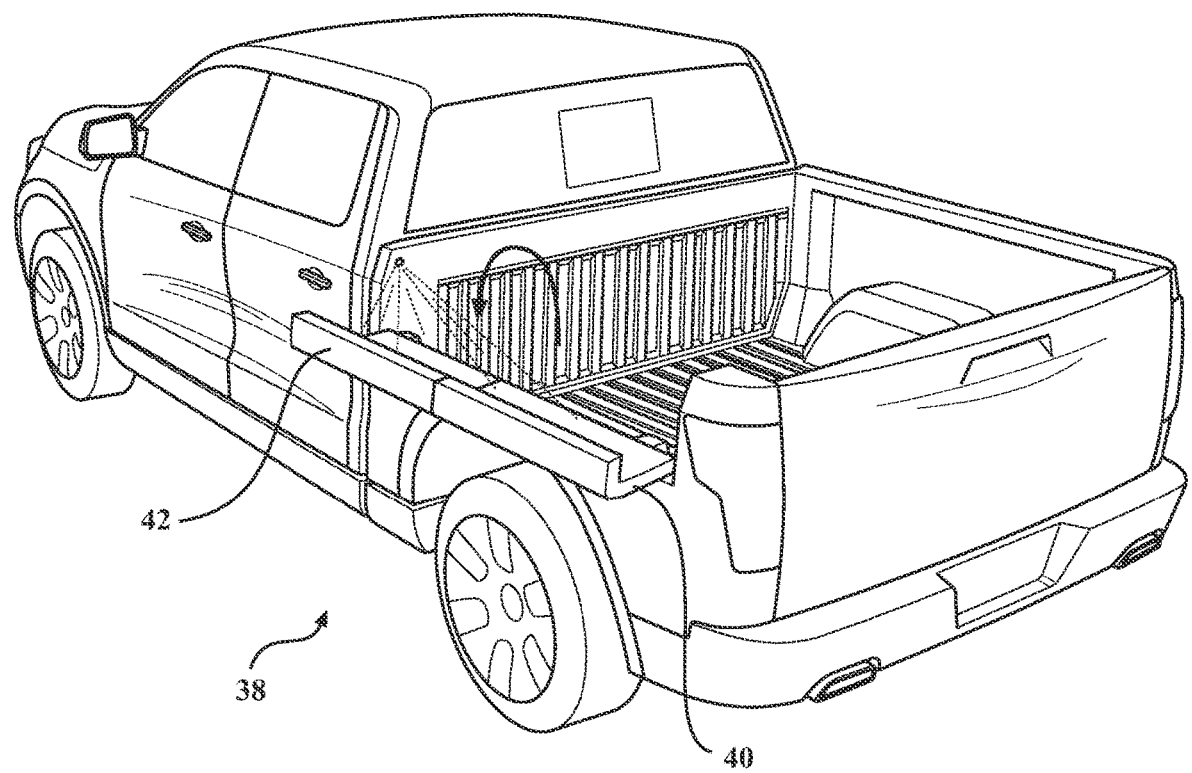

FIGS. 5 and 6 the dual door of FIG. 1 is shown and the side door of FIG. 2 for comparison;

Referring now to FIG. 7 there is shown a 3-position rotating door generally indicated at 38. In position 1 (shown in FIG. 7*a* the door is center opening with two doors 40,42 opening away from each other for side access to the pickup truck bed 14 along a vertical hinge axis V-V. In position 2 (shown in FIG. 7*b*) the doors 40 and 42 rotate along a horizontal access H-H to provide a tray area for temporary storage of tools or the like. In the third fold down position (shown in FIG. 7*f*) both doors 40, 42 fold down to provide a storage or work shelf on the side of the truck. The hinges include detent locking mechanisms 44, 46, 48 to provide securement of the doors in each of the positions. The hinges include a vertical hinge 46*a* and 46*b*. The hinges include door connection flanges 46*c*, 46*d* which are hingedly connected to an offset linkage 46*e* and 46*f*. each offset linkage includes has a u shaped member 47 which includes a first leg 47*a* and intermediate leg 47*b* and a base leg 47*c* to provide clearance of the door from the body. The base leg is attached to the horizontal axis rotating member 44*a*. Thus in operation the doors would open on the vertical axis which would give proper body clearance due to the offset linkage. Thereafter the doors could be rotated along the horizontal axis. To allow for a work ledge or the like.

Figure 8:
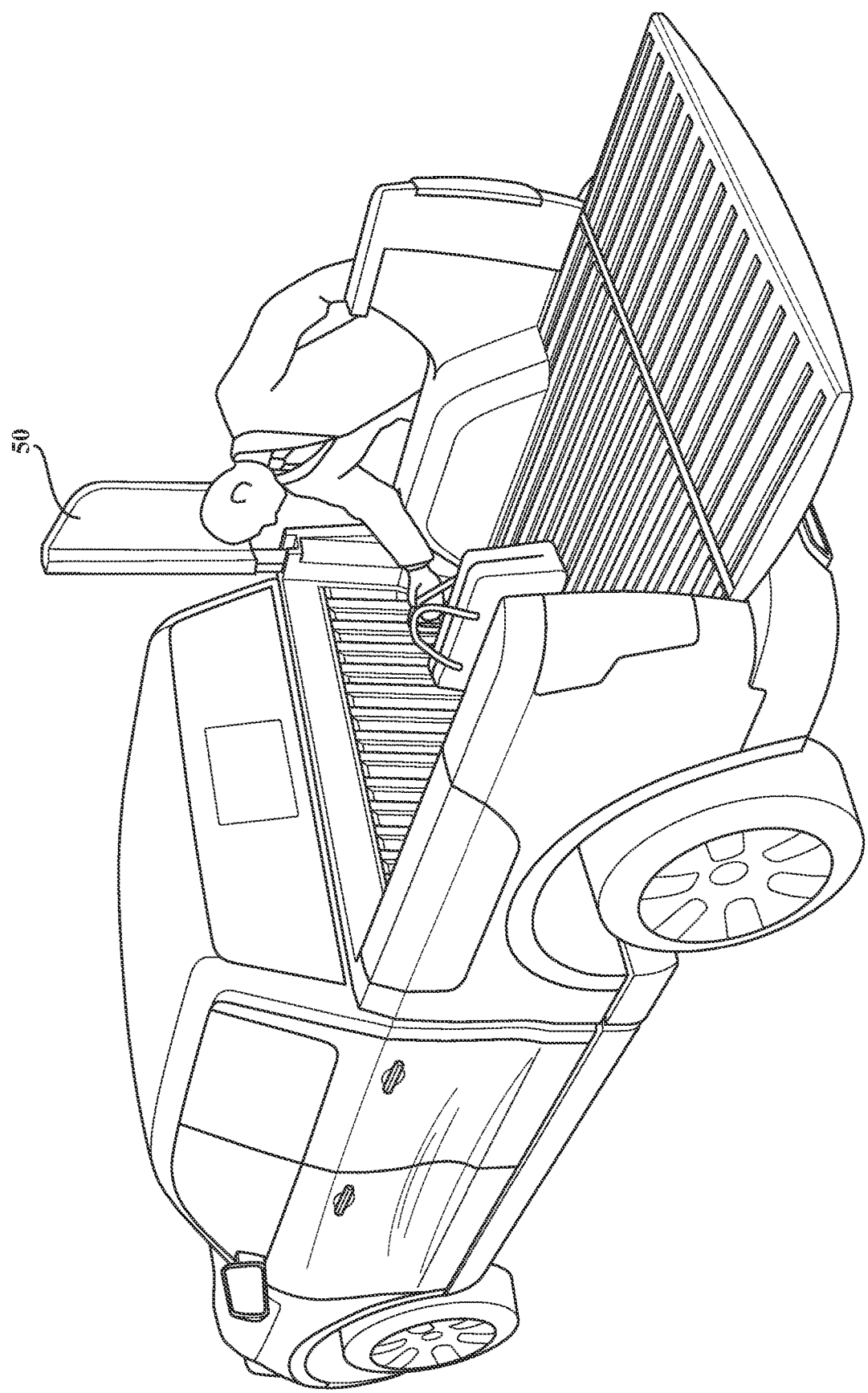
FIG. 8 is a perspective view of a side door which is hinged for vertically opening toward the front of the vehicle.
Figure 9A:
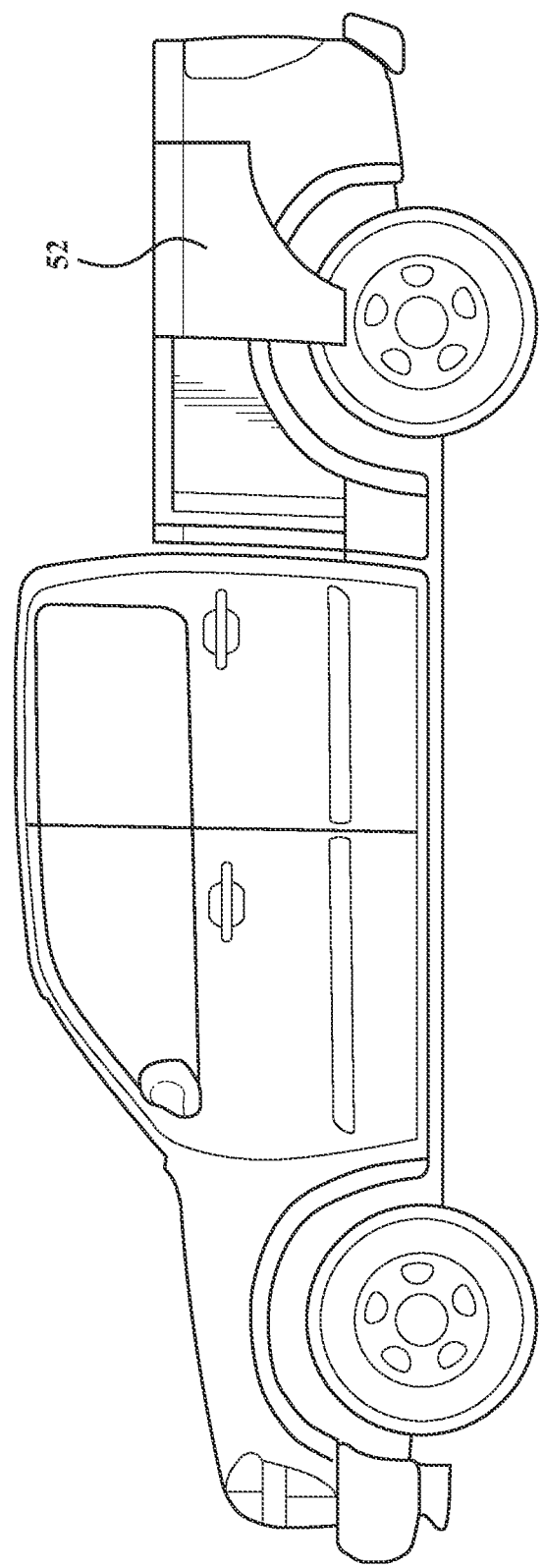
FIG. 9a-9d are perspective side views showing a hinged door which allows the door to move out and rearward for opening of the door.
Figure 9B:
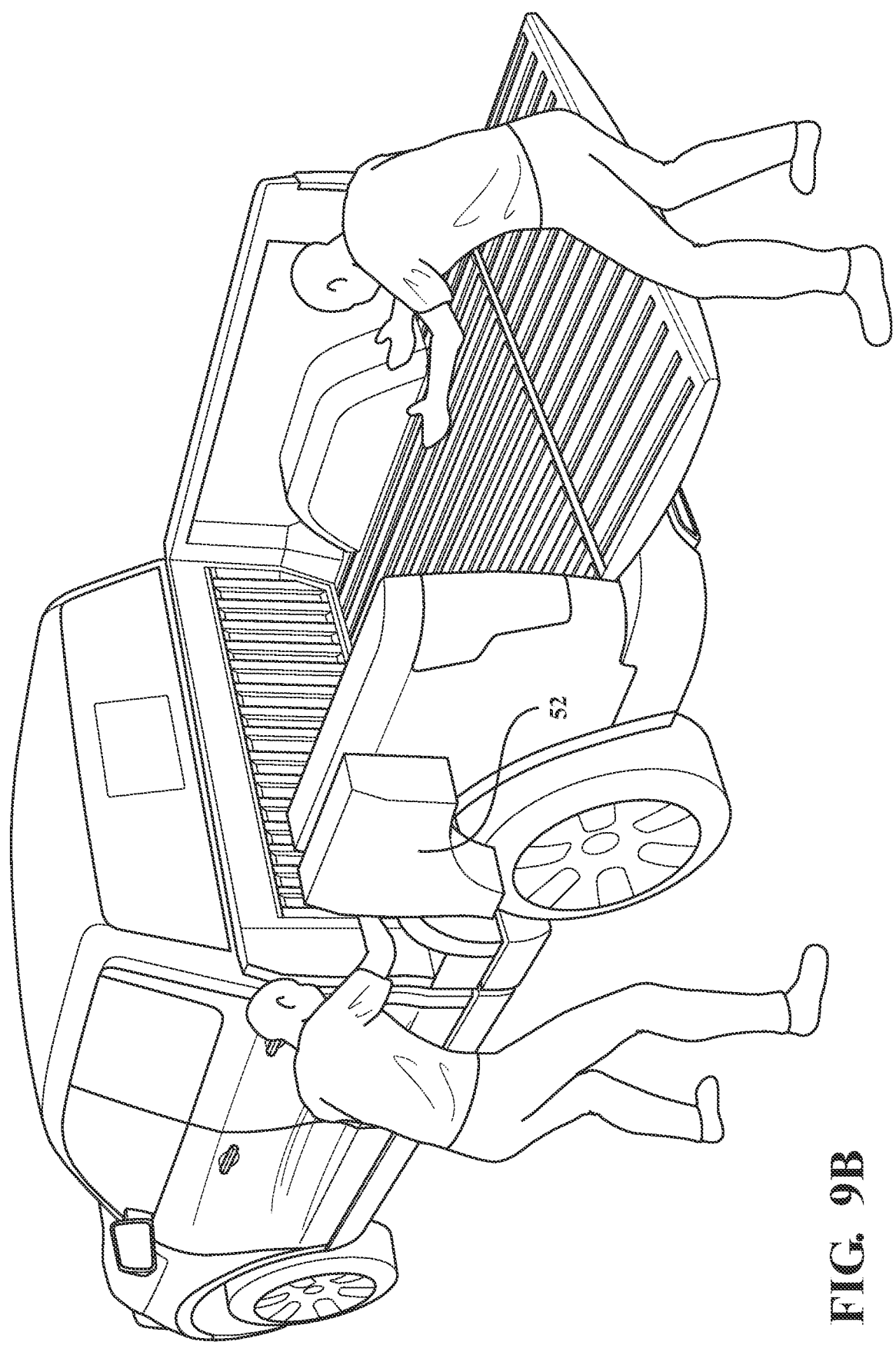
Figure 9C:
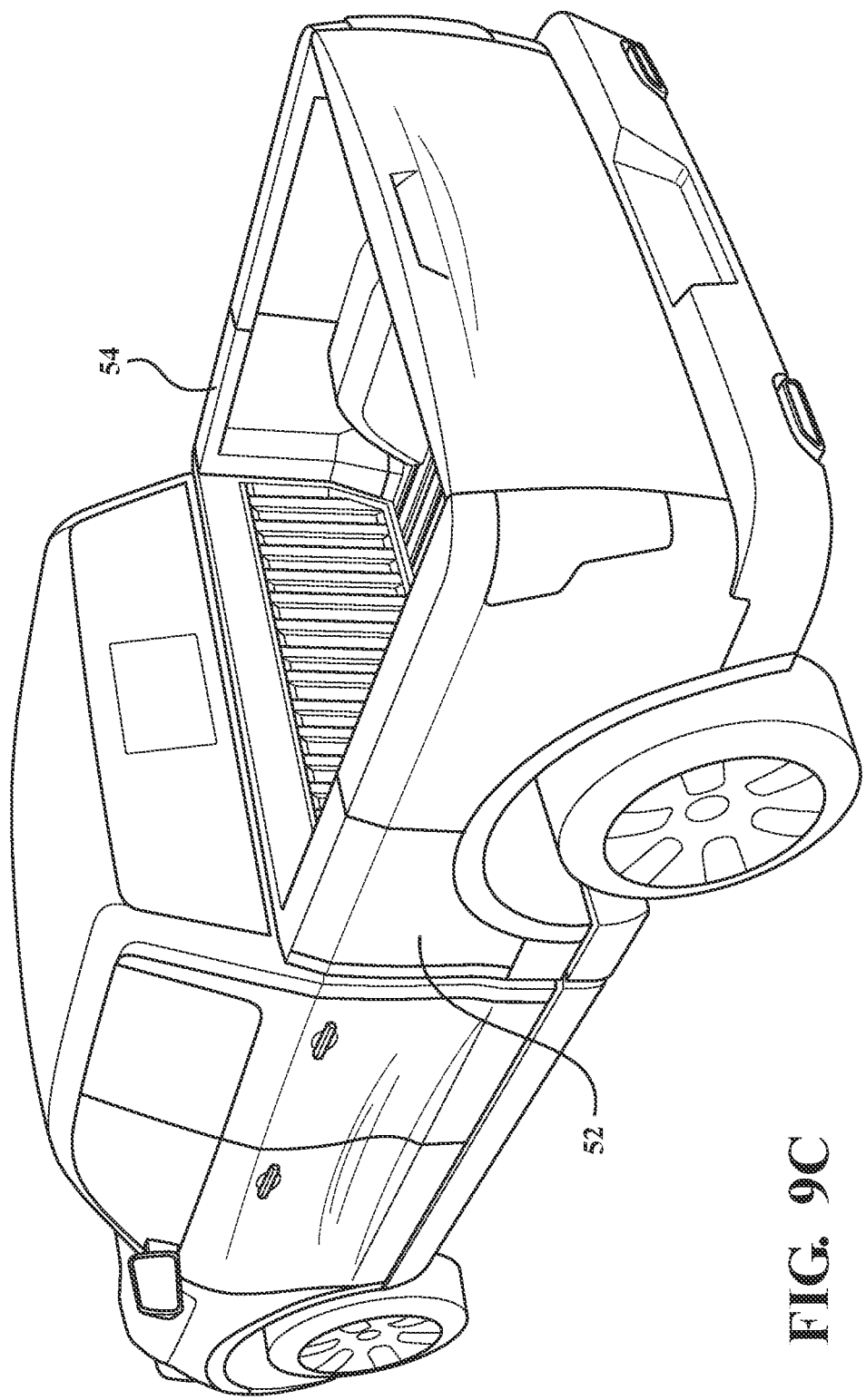
Figure 9D:
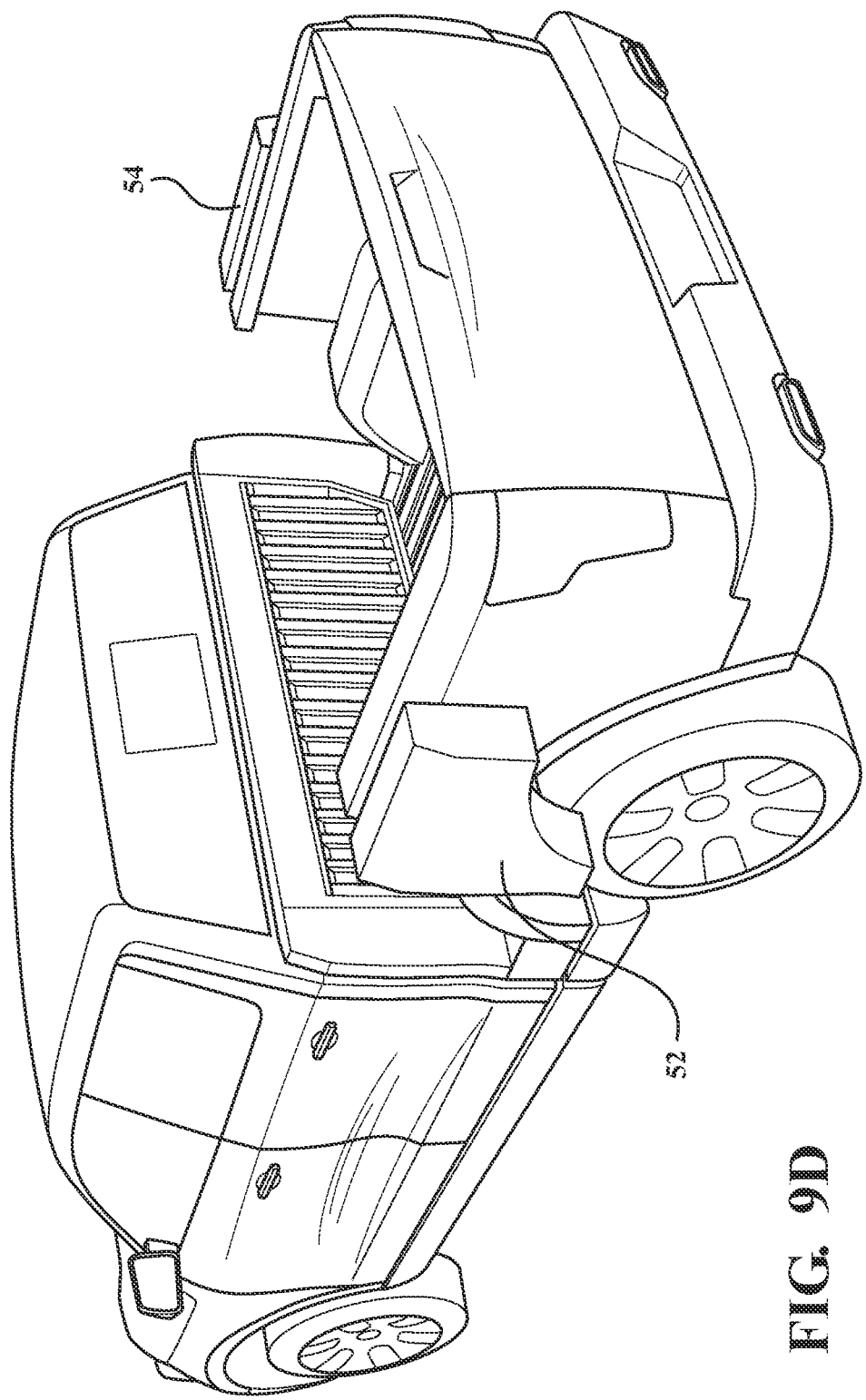

Referring now to FIG. 8 there is shown a forward longitudinally tilting door 50.

FIGS. 9*a*-9*d* show a pair of door 52 and 54 on both sides of the bed 14. In this embodiment hinging systems 56 and 58 shown in FIGS. 10 and 11 are used to initially upon opening send the doors out laterally and thereafter the doors can be opened rearwardly for access to the pickup bed 14. A rotational rod mechanism as shown at 60 operates to hinge the door 52 outward. The rods 62 rotate along axis A-A a second rod 64 connects to sliding tracks 66 by way of cross members 68. After the door is fully out the rods slide along the axis A-A for retracting the door 52.

Referring to FIG. 11 the door 54 is flush with the sidewall 20 when closed. A four-bar linkage mechanism 70 is used upon initial opening to move the door laterally outward 72 thereafter a slide member 74 slides for retraction of the door into its open position. The four bar mechanism includes four linkage arms 70*a*, 70*b*, 70*c*, and 70*d* which are pivotally connected for movement together via pivots 71*a*, 71*b*, 71*c* and 71*d*. As shown in FIG. 11 the bars rest upon themselves in a line with 70*c* and 70*d* overlapping in a line and 70*b* and 70*a* overlapping in a line when the door 54 is closed. As the door 54 is unlatched and open the linkages extend the door outward from the vehicle with the arms 70*a* and 70*c* remaining parallel until they are fully extended as shown in the middle figure in FIG. 11. This allows clearance of the door when retracting it alongside of the vehicle.

Figure 12:
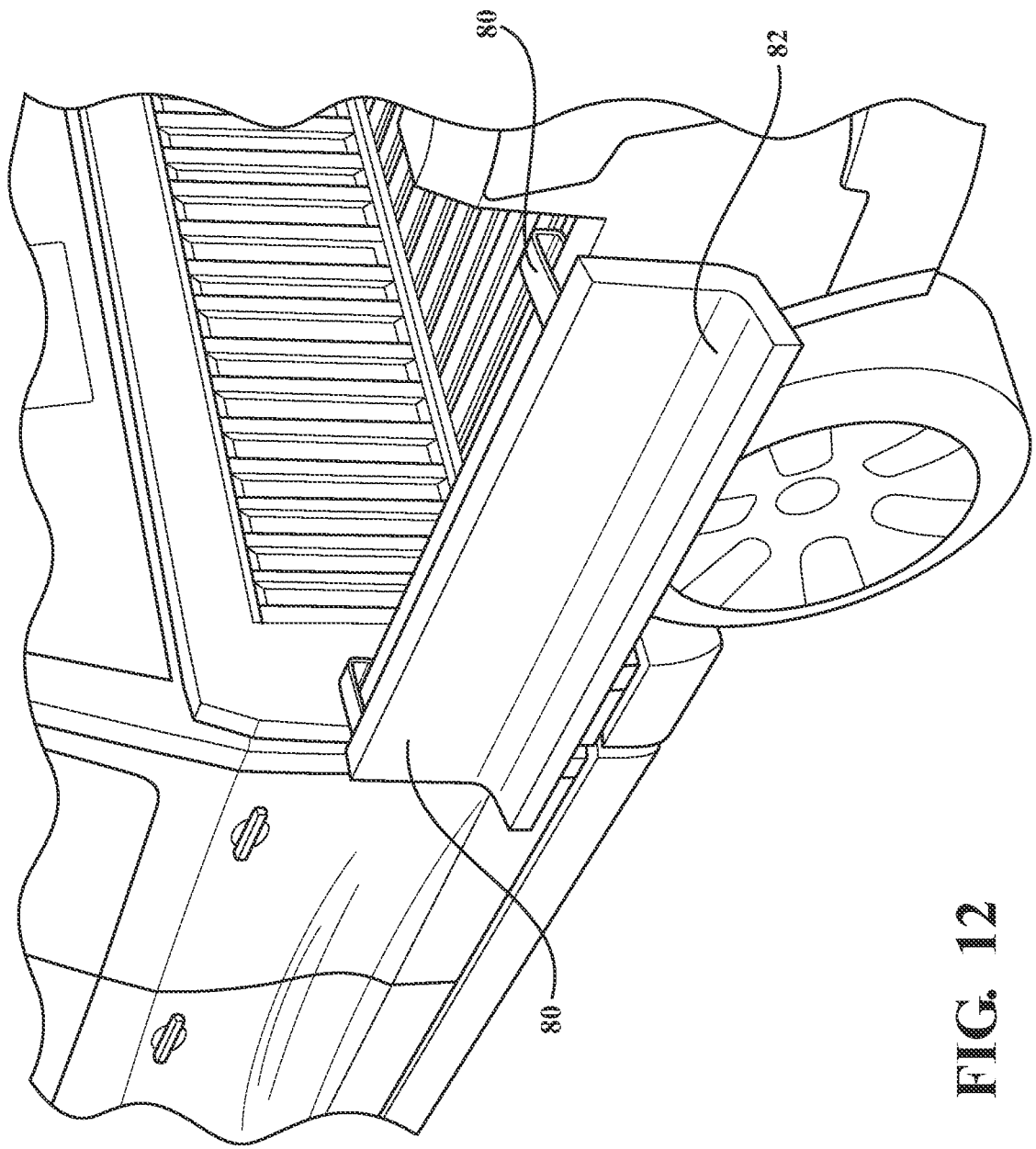
FIG. 12 is a perspective view showing a fold down door arrangement which also provides a stepping surface.

Referring now to FIG. 12 the door 80 has hinges 82 and 84 which hinge the door downward to provide side access and a step 82.

Figure 13A:
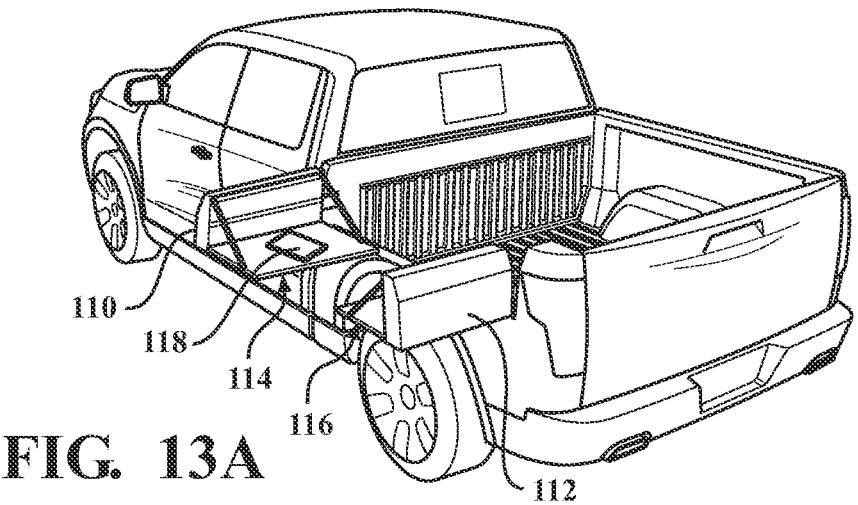
FIGS. 13A-13E are perspective views showing alternate embodiments of a center opening side bed gate design with utility tray features.
Figure 13B:
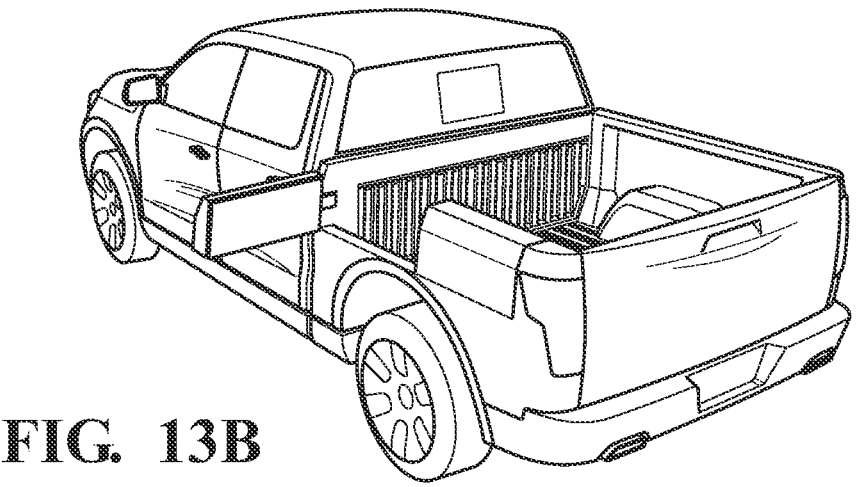
Figure 13C:
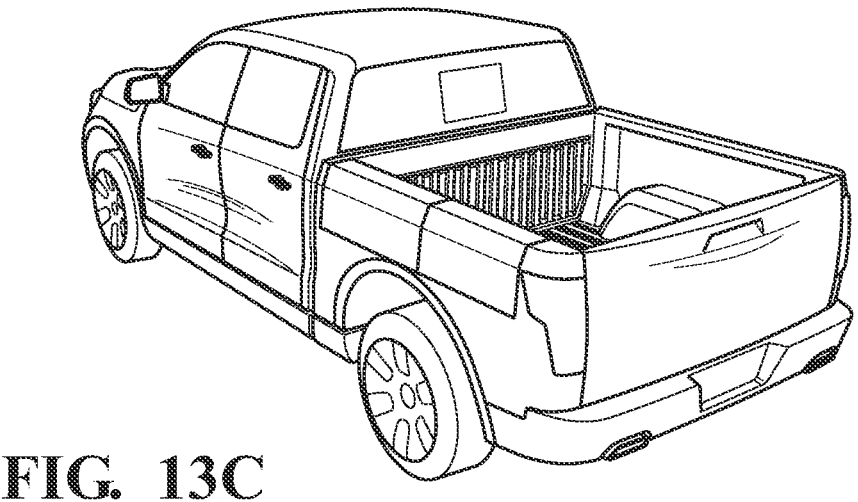
Figure 13E:
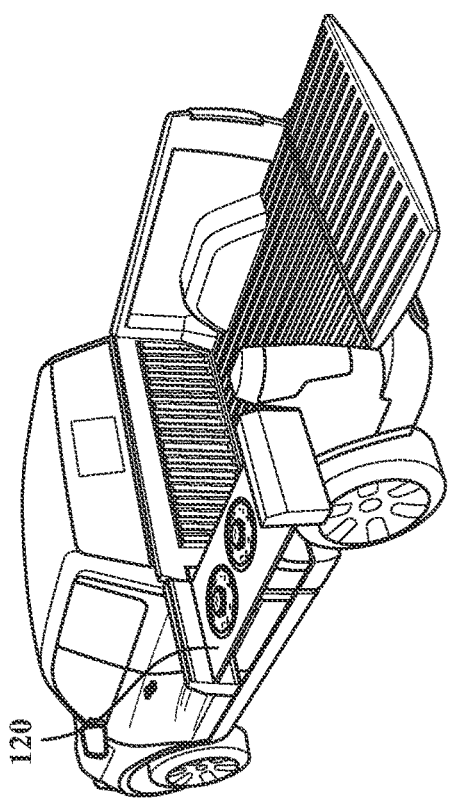
Figure 13G:
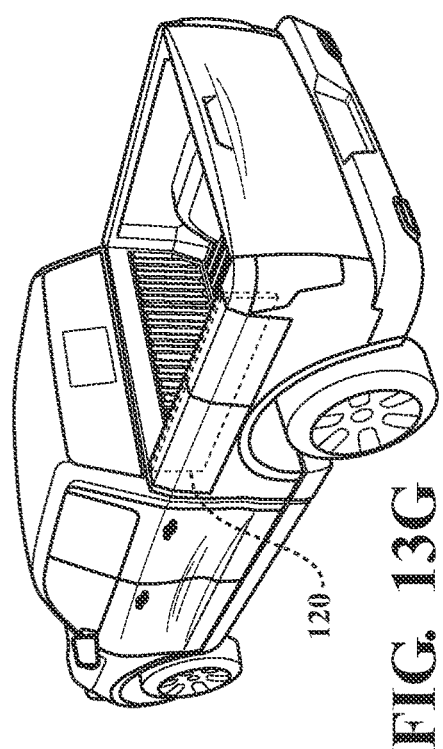
FIG. 13G is a perspective view showing the doors in a closed position with a tray stowed.
Figure 13D:
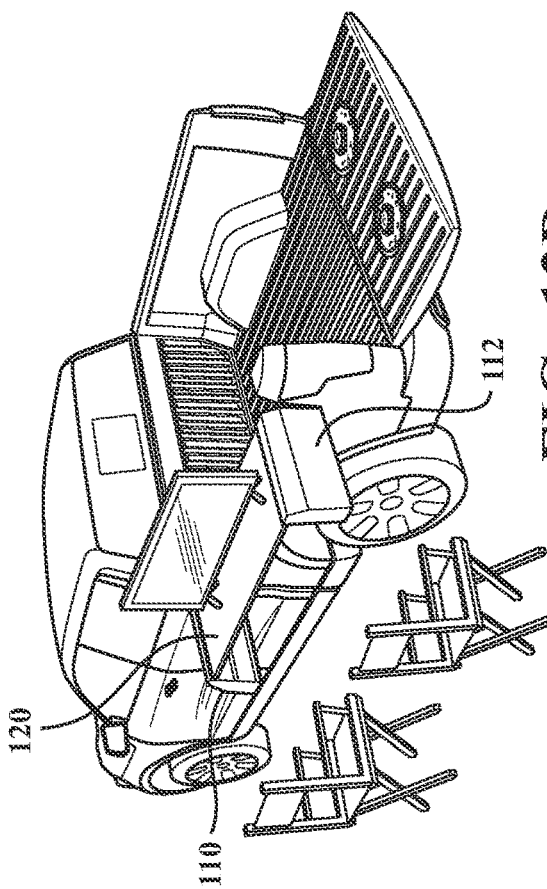
Figure 13F:
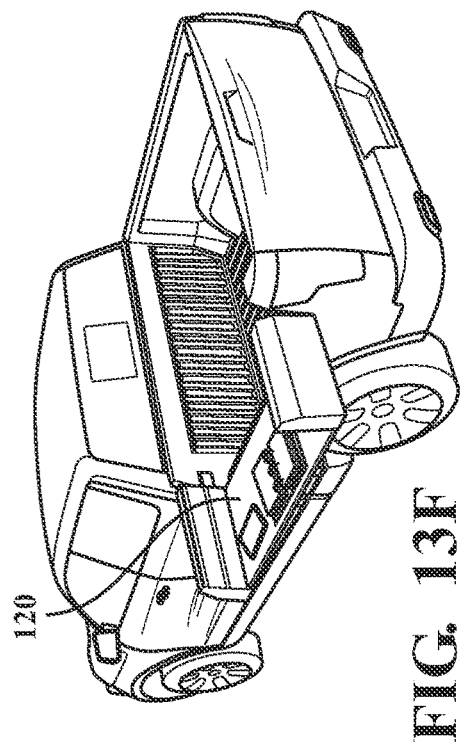
FIG. 13F Is a perspective view similar to 13E showing an alternate position of a tray.

Referring now to FIG. 13*a*-13*c* includes a vertically hinged center opening doors 110 and 112. Each door includes a deployable drop down tray 114, 116. As shown in the figures the tray 114 or 116 could be used as a work surface in the field for a laptop or tablet 118. Thus, the operator of the vehicle could have both doors open with two trays, front or rear doors open with a single tray or both doors closed and shut.

Referring now to FIGS. 13D-13G there is shown and alternate embodiment which includes a working surface tray 120 that can be positioned at predetermined working levels between doors 110 and 112. The tray is either slideable into tracks on the doors 110 when open or is hingedly positioned along a vertical track for hinging upward and engaging in keyhole height positions. Other ways of hinging or attaching the tray 120 at low (FIG. 13F), Medium (FIG. 13E) or a high vertical position for a side rail height (FIGS. 13D and 13G) are provided as will be readily appreciated by those skilled in the art.

Figure 14A:
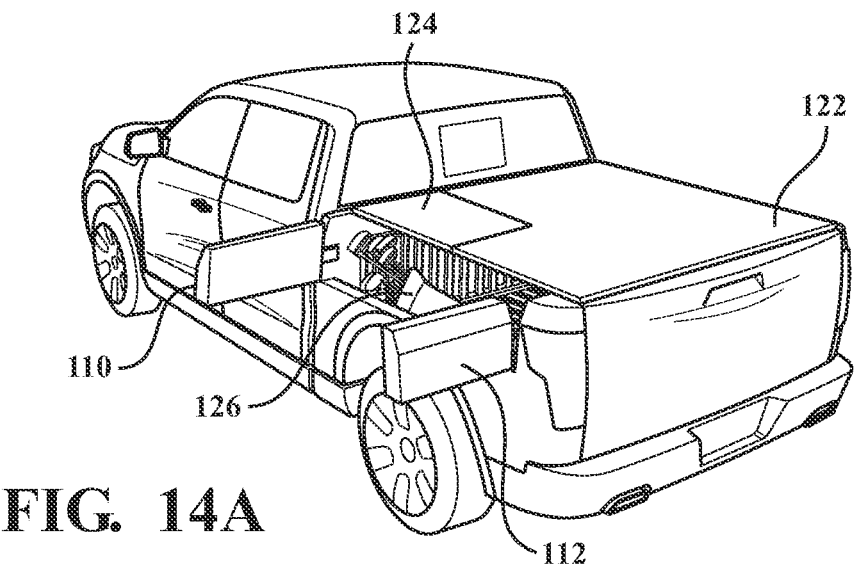
FIGS. 14A-14C are further perspective views showing side access to the bed cargo area of a truck with a tonneau cover; and, FIGS. 14D and 14E show side door features allowing access to features when the cargo bed is inaccessible because it contains cargo.
Figure 14B:
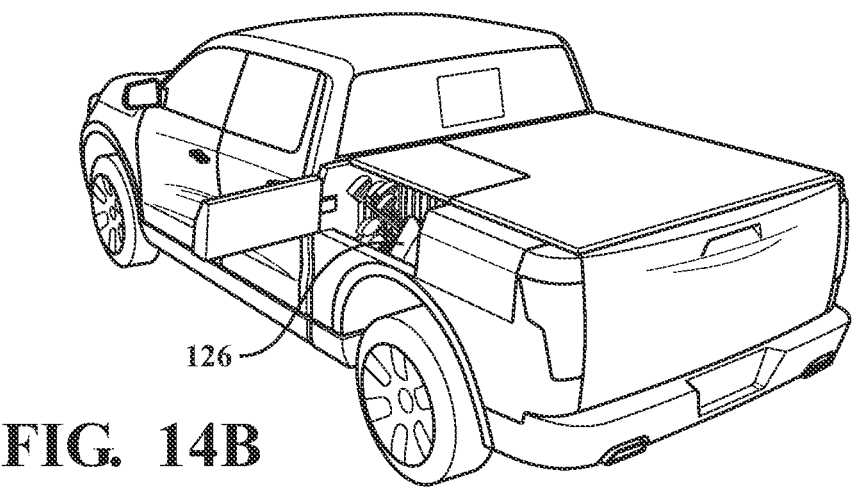
Figure 14C:
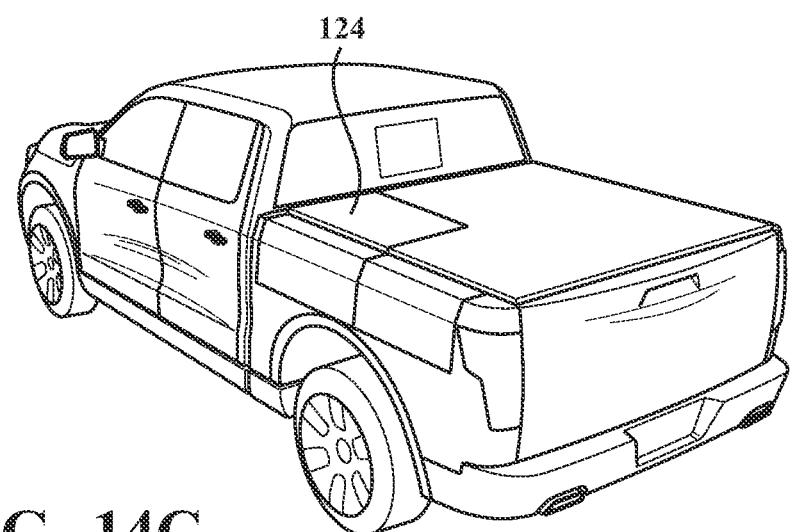

Referring now to FIGS. 14A-14C a pickup truck is shown with a tonneau cover 122. Tonneau cover 122 includes a longitudinally hinged upwardly opening door 124 which provides access at the location of the side doors 110, 112. This allows access for cargo such as a golf bag 126 or the like. Thus, one or more of the doors 110, 112 and 124 are used for access of the front portion of the truck bed.

Figure 14D:
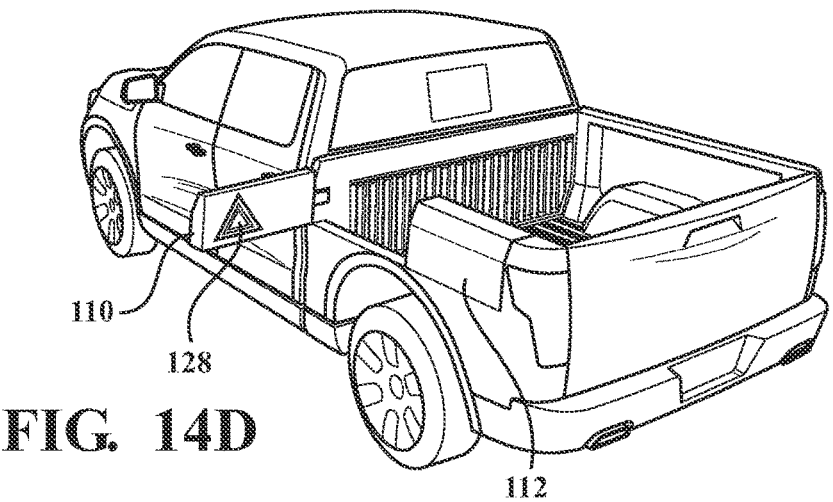
Figure 14E:
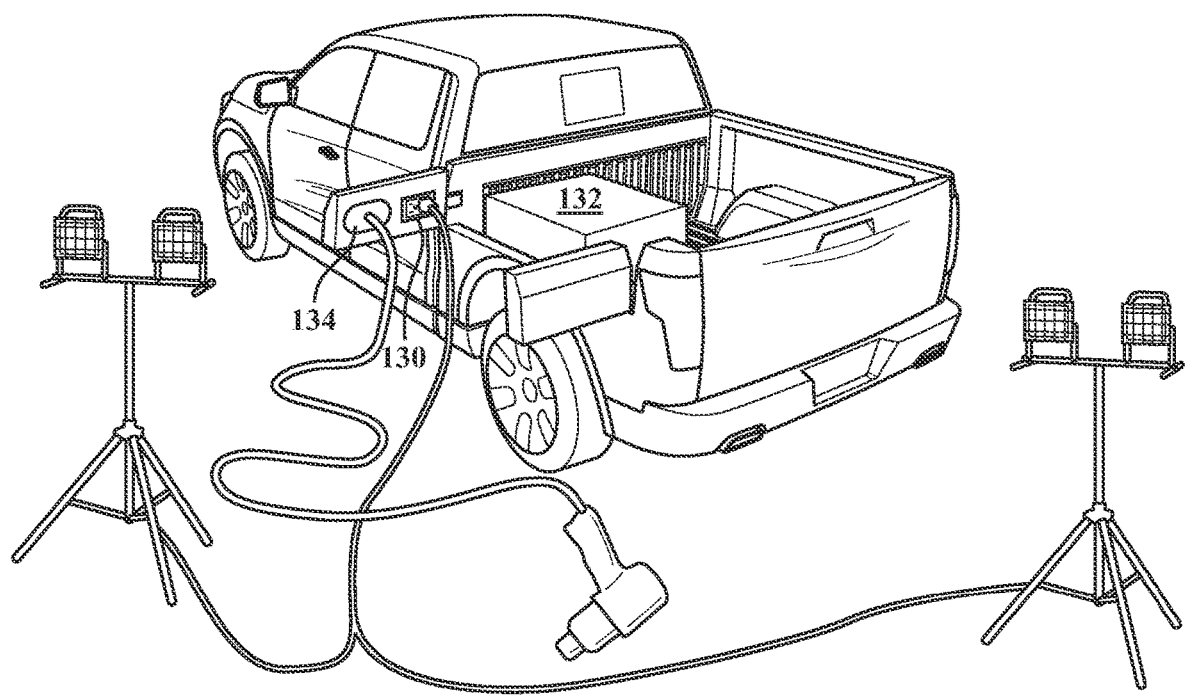

Referring now to FIG. 14*d* with the front door 110 open and the rear door 112 closed a slow-moving vehicle or other emergency lighted or reflective sign 128 is visible from the rear of the vehicle in emergency or other situations. As shown in FIG. 14*e* an electrical panel, USB or other charging outlet or receptacle 130 is placed on the front door and/or rear door which allows access to features which are blocked by cargo 132. A light reflector or flashing light 134 is also provided in the door 110. This allows further usefulness as to desirable and useful features in a vehicle.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An access door for a vehicle including an open truck bed assembly including a front wall, two side walls and a rear wall comprising:

a door portion on one of the side walls on a substantially horizontal hinged axis for providing side access to the truck bed for opening the door in a longitudinal direction such that it is stowed against the upper part of the truck bed wall in its open position.

2. The access door of claim 1 further comprising a latch for holding the door closed.

3. The access door of claim 2 wherein a door is provided on each side of the truck bed.

4. The access door of claim 1 wherein an outer surface of the door is a show surface contour and paint matching surface of the vehicle.

5. The access door of claim 1 wherein an inner door surface matches surfaces on an interior of the truck bed.

6. The access door of claim 1 further comprising a feature on an open front door selected from the group of a charging outlet, a power outlet for lights or tools, an emergency light, emergency reflectors and combinations of these.

7. An access door for a vehicle including an open bed assembly including a front wall, two side walls and a rear wall comprising:

a door portion on one of the side walls of the liftgate opening on a substantially horizontal hinged axis for providing side access to the truck bed for opening the door in a longitudinal direction such that it opens forward and rests against a back side of the truck cab in its open position.

8. An access door for a vehicle including an open bed assembly including a front wall, two side walls and a rear wall comprising:

a door portion on one of the side walls of the liftgate opening on a substantially vertical hinged axis for providing side access to the truck bed wherein the door has multiple rotating detented positions and wherein the positions include a first position where the door rotates along a vertical axis for rotating outward, a second position where the door can rotate along a lateral horizontal access outward and a third position wherein the door can rotate along a longitudinal access outward.

9. The access door of claim 8 wherein a fourth position is provided where int the door rotates along the longitudinal axis generally over a range of 180 degrees and provides a lateral horizontally extending step position.

* * * * *